United States Patent [19]

Nishiwaki et al.

[11] Patent Number: 5,083,273

[45] Date of Patent: Jan. 21, 1992

[54] TEMPERATURE DETECTION FOR ELECTROMAGENTIC CLUTCH OF VEHICLE

[75] Inventors: Fumihiko Nishiwaki; Munehiko Mimura, both of Hyogo, Japan

[73] Assignee: Mitsubishi Denki K.K., Tokyo, Japan

[21] Appl. No.: 538,618

[22] Filed: Jun. 15, 1990

[30] Foreign Application Priority Data

Jun. 27, 1989 [JP] Japan .................................. 1-164727
Jun. 27, 1989 [JP] Japan .................................. 1-164728

[51] Int. Cl.$^5$ ............................................. B60K 41/18
[52] U.S. Cl. ............................. 364/424.1; 192/0.03; 74/866
[58] Field of Search ............... 364/424.1, 557; 74/866; 192/0.03

[56] References Cited

U.S. PATENT DOCUMENTS

| 4,807,132 | 2/1989 | Arai et al. | 364/424.1 |
| 4,949,264 | 8/1990 | Katayama et al. | 364/424.1 |
| 4,951,206 | 8/1990 | Kyohzuka | 364/424.1 |

Primary Examiner—Thomas G. Black
Attorney, Agent, or Firm—Sughrue, Mion, Zinn, Macpeak & Seas

[57] ABSTRACT

A temperature detection device for an electromagnetic clutch of a vehicle comprises an output circuit operation detection device for detecting an output terminal voltage of the clutch and a current feedback signal corresponding to a clutch current, clutch current a calculation device which responds to running control information and engine control information for providing a clutch current instruction signal and a clutch open signal, responds to the clutch output terminal voltage fedback from the clutch output circuit operation detection device for calculating a clutch voltage by taking a voltage drop in a wiring and a feeding mechanism of the clutch and responds to this clutch voltage and the clutch current corresponding to the current feedback signal for calculating a clutch resistance to thereby calculate a clutch temperature and the clutch current instruction signal and clutch current control device responsive to a deviation between the clutch current instruction signal and the current feedback signal and the open signal for controlling the clutch current of the clutch.

2 Claims, 4 Drawing Sheets

TEMPERATURE DETECTION FOR ELECTROMAGENTIC CLUTCH OF VEHICLE

BACKGROUND OF THE INVENTION

The present invention relates to an improvement of a temperature detection device for detecting the overheating of an electromagnetic clutch of an automobile or the like.

Generally, transmission of torque of an electromagnetic mechanism such as an electromagnetic clutch is on-off controlled by controlling power supplied to an exciting coil thereof. It is known that, due to a large friction loss caused by a difference in rotation number between an input shaft and an output shaft and the transmission torque, heat is generated in the clutch. Since the exciting coil is generally arranged in the vicinity of a portion of the clutch in which friction loss occurs, temperature of the coil may be increased, causing the electric resistance thereof to be increased which may lead to an over voltage or over current of an output transistor connected to the coil, damaging the latter as well as the output transistor. Therefore, in order to restrict heat generation to thereby prevent the output transistor and the coil from being damaged, it is usual to detect temperature of the coil to thereby control a current supply thereto. The temperature detection is performed by detecting a variation of voltage across the coil according to a coil voltage and a current instruction value.

FIG. 4 is a block diagram showing an example of a construction of a conventional control device of an electromagnetic clutch to be mounted on a car, which corresponds to FIG. 5 of Japanese Patent Kokai No. 57342/1988 which was invented by a co-inventor of this application.

In FIG. 4, the control device includes a clutch current control portion 1, a clutch current calculating portion 2 such as microcomputer and a car-battery 3. The clutch current control portion 1 includes a differential amplifier 14, a pulse width modulator (referred to as PWM hereinafter) 15 and a pair of output transistors 11 and 12. The clutch current calculating portion 2 is supplied with a car running control information SD and an engine control information SE. A clutch current instruction signal SI and a clutch open signal SO which are calculated by the clutch current calculating portion 2 on the basis of the control informations SD and SE are supplied to a (+) input terminal of a differential amplifier 14 of the clutch current control portion 1 and to a base of the output transistor 12, respectively.

An emitter of the transistor 12 is connected to a grounded negative terminal of the battery 3 through a clutch current detection resistor 13. The emitter of this transistor 12 is also connected to a (−) input terminal of the differential amplifier 14 to supply a current feedback signal SF thereto.

The differential amplifier 14 serves to obtain a difference between the clutch current instruction signal SI and the current feedback signal SF. An output of the differential amplifier 14 is connected to an input of the PWM 15 and an output of the latter is connected to a base of the transistor 11 so that the transistor 11 is on/off operated by an output signal of the PWM 15. An emitter of the transistor 11 is grounded through a parallel circuit of a diode 16 and a transistor 18 and is connected to an output terminal 20 of the clutch current control portion 1.

A collector of the transistor 12 is connected through a parallel circuit of a resistor 19 and an overvoltage preventing diode 17 to a positive terminal of the battery 3 and to another output terminal 21 of the clutch current control portion 1. Each of the resistors 18 and 19 is to supply a small reverse current to the electromagnetic clutch 4 when both the transistors 11 and 12 are turned off.

The electromagnetic clutch 4 is composed of a magnetizing coil 41 and the feeding mechanisms 42a and 42b connected in series with the coil. The output terminals 20 and 21 of the clutch current control portion 1 are connected to the feeding mechanisms 42a and 42b of the electromagnetic clutch 4, respectively, to supply an energizing current to the coil 41 when desired.

FIG. 5 is a circuit diagram showing the differential amplifier 14 and the PWM 15 of the clutch current control portion 1 in detail, which corresponds to FIG. 6 of the Japanese Patent Kokai No. 98822/1985 which was invented by a co-inventor of this application. In FIG. 5, similar portions to those in FIG. 4 are depicted by similar reference numerals and a dotted block depicted by 14, 15 shows the differential amplifier 14 and the PWM 15, in detail.

The clutch current instruction signal SI from the clutch current calculating portion 2 is supplied through a resistor 14a to the (+) input terminal of the differential amplifier 14. Resistors 14b and 14c are connected in series with each other between the (+) input terminal of the amplifier 14 and the positive terminal of the battery 3.

The PWM 15 is composed of resistors 15a and 15c and a transistor 15b.

The output terminal of the differential amplifier 14 is connected through the resistor 15a to a base of the transistor 15b and lo a junction between the resisters 14b and 14c.

The transistor 15b constitutes a main portion of the PWM 15 and has an emitter grounded and a collector connected through the resistor 15c to the base of the transistor 11.

A reference numeral 11a depicts a resistor connected between the emitter and the base of the transistor 11.

Although a circuit including the transistors 11 and 12 and the electromagnetic clutch 4 is somewhat different from that shown in FIG. 4, their functions are substantially the same.

To the base of the transistor 12, the clutch decoupling or open signal SO is supplied through a resistor 12a.

A reference numeral 50 depicts a voltage detection circuit which has a comparator 50a and a series circuit of a filter 24 and a zener diode 23 connected between the collector of the transistor 11 and ground.

The filter 24 is composed of a series circuit of a resistor 24a and a capacitor 24b and a junction of these elements is connected to a (+) input terminal of the comparator 50a. To a (−) input terminal of the comparator 50a, the clutch current instruction signal SI from the clutch current calculating portion 2 is supplied.

An output terminal of the comparator 50a is connected through a resistor 50b to the positive terminal of the battery 3 and to an output terminal 50c to provide a voltage detection signal SC2.

Now, an operation of the control device shown in FIGS. 4 and 5 will be described, starting from the clutch current calculating portion 2.

This clutch current calculation portion 2 operates to obtain a vehicle speed first and then an engine revolution. As mentioned the portion 2 responds to the running control information SD and the engine control information SE to calculate clutch torque in term of a clutch current.

When the electromagnetic clutch 4 is opened, the transistors 11 and 12 are turned on by the output of the PWM 15 and the open signal SO from the clutch current calculating portion 2.

As a result, a small reverse current flows through the resistor 19, the coil 41 of the electromagnetic clutch 14 and the resistor 18.

When the electromagnetic clutch 4 is connected, the transistor 12 is kept conductive and clutch current is detected through the clutch current detecting resistor 13.

The clutch current detected by the clutch current detecting resistor 13, that is, the current feedback signal SF is fed back to the (−) input terminal of the differential amplifier 14. The clutch current instruction signal SI from the clutch current calculating portion 2 is supplied to the (+) input terminal of this differential amplifier 14. The clutch current instruction signal SI and the current feedback signal SF are compared by the differential amplifier 14 and a resultant difference is supplied to the PWM 15. The PWM 15 pulse-width modulates the output of the differential amplifier 14 and supplies a resultant pulse to the base of the transistor 11. Therefore, this transistor 11 is on-off controlled according to the pulse width of the output of the PWM 15 to control the clutch current of the electromagnetic clutch 4.

Through the diode 16, a current circulates when the transistor 11 is turned off.

In FIG. 5, the temperature detection of the electromagnetic clutch 4 is performed during closure thereof which is caused by turning-on of the transistor 11. When the clutch 4 is closed a current flows through the coil 41 of the electromagnetic clutch 4 and a voltage drop across the electromagnetic clutch 4 including the feeding mechanisms 42a and 42b is applied to the filter 24. The filter 24 provides a temporal coil resistance due to the voltage drop caused by the pulse-width modulated, magnetizing current which flows through the magnetizing coil 41.

Voltage drops of the feeding mechanisms 42a and 42b are substantially constant regardless of the temperature of the clutch and current flowing therethrough and, therefore, the transistor 12 and the diode 16 are influenced directly by a forward component of the voltage drop. Therefore, for the forward drop of the zener diode 23, voltage drops of the feeding mechanism 41, 42 and the negative said transistor 12 can be cancelled.

That is, in FIG. 5, the comparator 50a compares the voltage drop across the electromagnetic clutch 4 supplied from the filter 24 with the clutch current instruction signal SI and provides a detection signal SC2. In other words, the temperature of the electromagnetic clutch 4 is detected by increase and decrease of clutch resistance.

Since the electromagnetic clutch 4 includes the feeding mechanisms 42a and 42b and the current feedback signal SF contains the voltage drops of the transistor 12 and the clutch current detection resistor 13, this current feedback signal SF contains substantial error.

Further, the output of the clutch current control portion 1 is a pulse-width modulated, on/off signal having magnitude corresponding to the source voltage. An overvoltage of the electromagnetic clutch 4 is detected by the voltage detection circuit 50 with an average voltage obtained by averaging this output voltage by the filter 24.

Therefore, it is impossible to obtain high precision of voltage detection and thus it is impossible to obtain accurate temperature detection. As a result, when used in a vehicle it is inadequate to improve the commercial quality of the product and the safety thereof.

Further, since temperature is detected by increase and decrease of the clutch resistance according to variations of the clutch current instruction signal SI and the current feedback signal SF, as mentioned above, when the source voltage saturates, that is, when an error between the clutch current instruction signal SI and an actual clutch current is large, it is impossible to detect temperature exactly and thus it is inadequate for use in a vehicle.

SUMMARY OF THE INVENTION

An object of the present invention is to obtain a temperature detection device of a vehicle electromagnetic clutch, which can detect exact clutch voltage and source voltage, calculate exact clutch temperature, prevent erroneous detection of clutch temperature by stopping clutch temperature detection when the source voltage is dropped and improve clutch temperature detection accuracy without degrading safety and product quality for use in a vehicle.

Another object of the present invention is to obtain a temperature detection device of a vehicle electromagnetic clutch, which can detect exact clutch voltage and clutch current, calculate exact clutch temperature and improve clutch temperature detection accuracy without degrading safety and product quality for use in a vehicle.

According to an aspect of the present invention, a temperature detection device for an electromagnetic clutch of a vehicle according to the present invention comprises output circuit operation detection means for detecting a current feedback signal corresponding to an output terminal voltage and a clutch current of the electromagnetic clutch, clutch current calculation means responsive to running control information and engine control information for providing a clutch current instruction signal and a clutch open signal, responsive to the clutch output terminal voltage fed back from the clutch output circuit operation detection means for calculating a clutch voltage by taking a voltage drop in a wiring and a feeding mechanism of the electromagnetic clutch and responsive to this clutch voltage and the clutch current corresponding to the current feedback signal for calculating a clutch resistance to thereby calculate a clutch temperature and the clutch current instruction signal and clutch current control means responsive to a deviation between the clutch current instruction signal and the current feedback signal and the open signal for controlling the clutch current.

The clutch output circuit operation means in this invention receives the clutch output terminal voltage of the electromagnetic clutch and a current feedback signal and feedbacks them to the clutch current calculation means which receives the running control information, the engine control information and the output of the clutch output circuit operation detection means, operates the clutch voltage by taking the voltage drops of the feeding mechanism and wiring into consideration and obtains an actual clutch current from the clutch current instruction value.

From the actual clutch current and the clutch voltage, the clutch resistance is calculated and, from the clutch resistance, the clutch temperature is obtained.

According to another aspect of the present invention, a temperature detection device for an electromagnetic clutch of a vehicle according to the present invention comprises output circuit operation detection means for detecting an output terminal voltage of the electromagnetic clutch and a source voltage, clutch current calculation means responsive to running control information and engine control information for providing a clutch current instruction signal and a clutch open signal, responsive to the clutch output terminal voltage and the source voltage fed back from the clutch output circuit operation detection means for calculating a clutch voltage by taking a voltage drop in a wiring and a feeding mechanism of the electromagnetic clutch and responsive to this clutch voltage and a clutch current instruction value corresponding to the clutch current instruction signal for calculating a clutch resistance to calculate a clutch temperature therefrom and clutch current control means responsive to a deviation between the clutch current instruction signal and the current feedback signal corresponding to the clutch current and to the open signal for stopping clutch temperature detection when the source voltage is dropped.

The clutch output circuit operation means in this invention receives the clutch output terminal voltage of the electromagnetic clutch and the source voltage and feedbacks them to the clutch current operation means which receives the running control information, the engine control information and the output of the clutch output circuit operation detection means, operates the clutch voltage by taking the voltage drops of the feeding mechanism and wiring into consideration and obtains the clutch current from the clutch voltage and the clutch current instruction value.

From the clutch current and the clutch voltage, the clutch resistance is calculated and, from the clutch resistance, the clutch temperature is obtained. Further, when the source voltage is dropped below a predetermined value, the clutch temperature detection is stopped.

DETAILED DESCRIPTION OF THE PREFERRED EMBODIMENTS

An embodiment of a temperature detection device of a vehicle electromagnetic clutch according to the present invention will be described with reference to the drawings.

Figure 1:
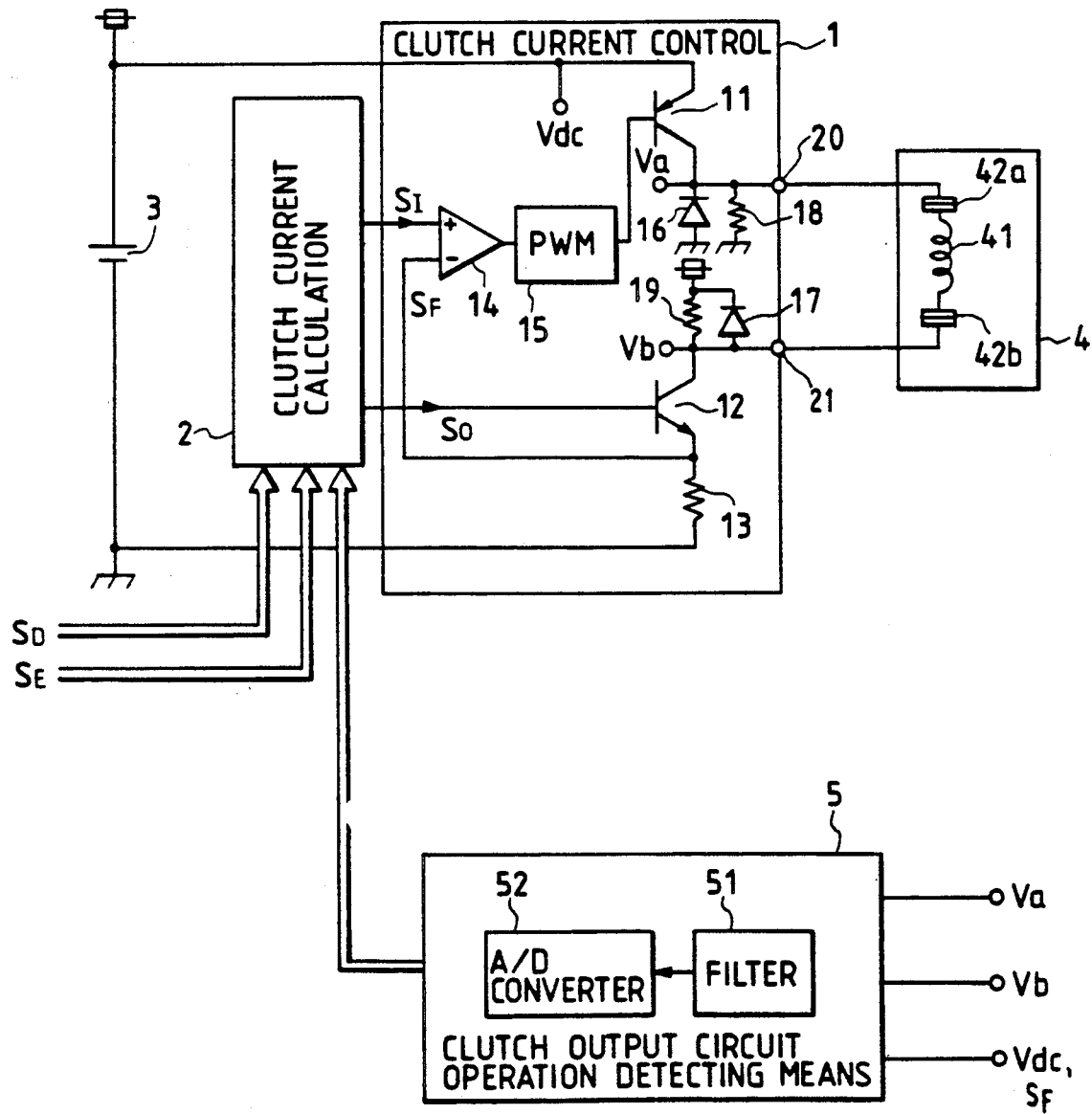
FIG. 1 is a block diagram of a temperature detection device of a vehicle electromagnetic clutch according to an embodiment of this invention.
Figure 4:
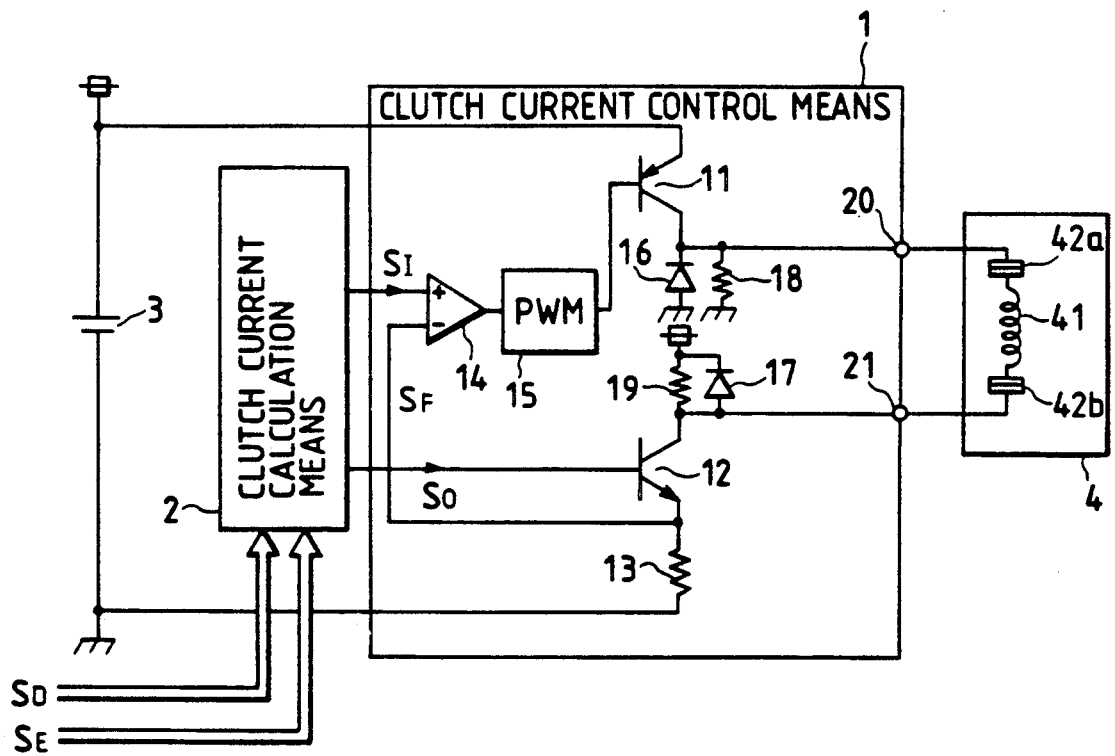
FIG. 4 is a block diagram of a conventional control device of a vehicle electromagnetic clutch.
Figure 5:
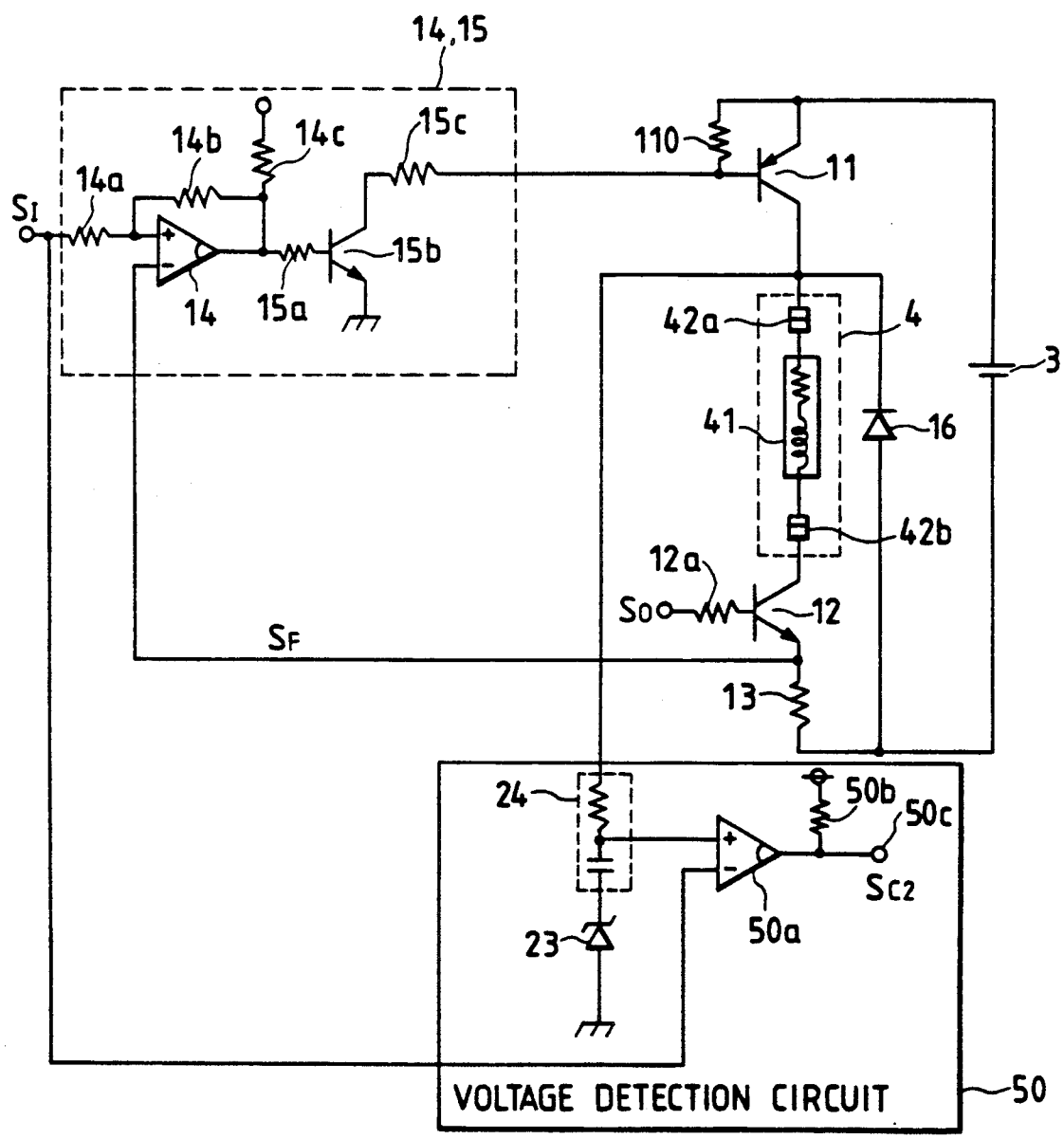
FIG. 5 is a circuit diagram showing, mainly, a differential amplifier and a PWM in the clutch current control means of the control device of the vehicle electromagnetic clutch in FIG. 4.

In FIG. 1 which is a block diagram showing a construction of the embodiment and similar portions to those shown in FIG. 4 are depicted by same reference numerals, only portions which are different from those in FIG. 4 will be explained mainly.

In FIG. 1, a clutch output circuit operation detection means 5 is newly added to the construction shown in FIG. 4. That is, the output circuit operation detection means 5 receives clutch output terminal voltages va, vb from opposite ends of an electromagnetic clutch 4, that is, from output terminals 20, 21 of a clutch current calculation means 1 and a current feedback signal SF from one end of a clutch current detecting resistor 13, that is, from an emitter of the negative side transistor 12.

Within the clutch output circuit operation detection means 5, a filter 51 and an analog/digital converter (referred to as A/D converter hereinafter) 52 are included.

The clutch output, terminal voltages are smoothened by the filter 51 and fed back through the A/D converter 52 to the clutch current operation means 2 and the current feedback signal SF is fed back through the A/D converter 52 to the clutch current calculation means 2. Other constructions are the same as those shown in FIG. 3.

Next, an operation will be described. A clutch current instruction signal SI is supplied from the clutch current calculation means 2 to a (+) input terminal of a differential amplifier 14 and the current feedback signal SF obtained from the clutch current detection resistor 13 is supplied to a (-) input terminal of the differential amplifier 14.

The differential amplifier 14 operates to obtain a deviation of the current feedback signal SF from the clutch current instruction signal SI and provides the deviation to a PWM 15.

The PWM 15 modulates pulse width with the output of the differential amplifier 14 and supplies a resultant signal to a base of a positive side transistor 11. The positive side transistor 11 is on/off controlled by the pulse width of the output of this PWM 15 and supplies a current to the electromagnetic clutch 4 when it is in the on state.

On the other hand, to a base of the negative side transistor 12, an open signal SO of the clutch is supplied from the clutch current calculation means 2.

This open signal SO is a signal having an on state when the clutch is fed and an off state when the clutch is opened. By this open signal, the negative side transistor 12 is on/off controlled.

When both the positive side transistor 11 and the negative side transistor 12 are in the off state, the electromagnetic clutch 4 is opened. However, in order to eliminate small transmission torque due to a clutch residual magnetism, a reverse magnetizing current is supplied from the vehicle mounted battery 3 through reverse magnetizing resistors 18, 19 to the electromagnetic clutch 4.

When the positive side transistor 11 is off and the electromagnetic clutch is connected, a current is supplied from the vehicle mounted battery 3 through a circulation diode 16 to the electromagnetic clutch 4.

An overvoltage preventing diode 17, operates to absorb a surge voltage of the negative side transistor 12 and to cut-off the clutch current sharply.

As described above, the electromagnetic clutch 4 operates upon the on/off operation of the positive side transistor 11 and the negative side transistor 12. At this time, the clutch output terminal voltages va and vb appear at the output terminals 20, 21.

The clutch output terminal voltages va and vb are supplied to the filter 51 within the clutch output circuit operation detection means 5. This filter 51 is to restrict voltage control ripple due to pulse width modulation of the PWM and the output terminal voltages va and vb whose ripples are restricted by the filter 51 are digitized by the A/D converter 52 and fed back to the clutch current calculation means 2.

The current feedback signal SF detected by the clutch current detecting resistor 13 is digitized by the A/D converter 52 within the clutch output circuit operation detection means 5 and fed back to the clutch current calculation means 2.

Figure 2:
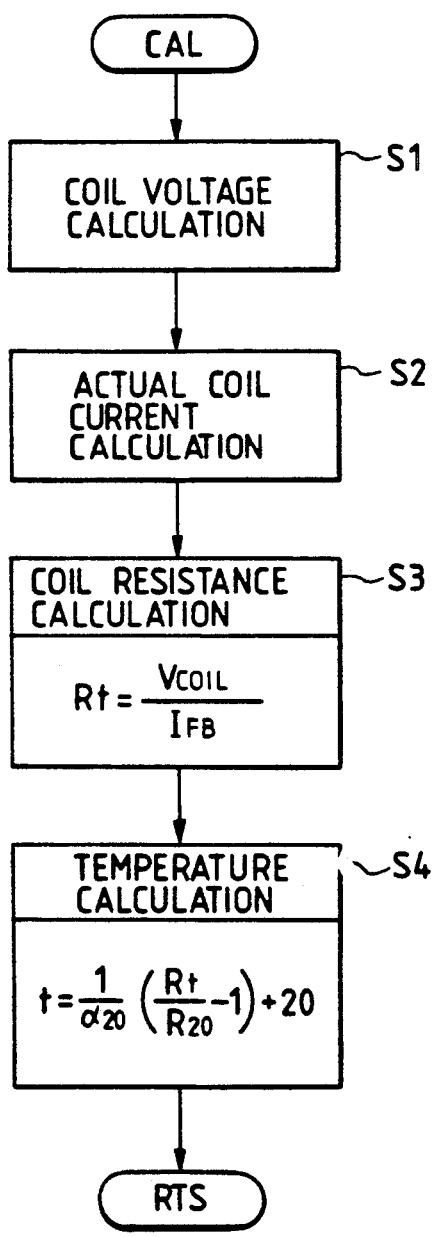
FIG. 2 is a flowchart showing procedures of clutch temperature calculation by means of a clutch current operation means in the embodiment.

A temperature calculation processing in the clutch current calculation means 2 will be described with reference to a flowchart shown in FIG. 2. In the step S1 in FIG. 2, from the clutch output terminal voltages va and vb which are A/D converted, a clutch voltage Vcoil is calculated by taking voltage drops of the feeding mechanisms 42a and 42b of the electromagnetic clutch 4 and the wiring into consideration.

Then, in the step S2, an actual clutch current Ifb is calculated from the current feedback signal SF which is A/D converted.

Then, in the step S3, a clutch resistance Rt is obtained from the clutch voltage Vcoil and the clutch actual current Ifb according to the following equation:

$$Rt = Vcoil/Ifb \qquad (1)$$

Then, in the step S4, an actual temperature t of the clutch can be obtained from the above clutch resistance Rt.

Since, according to this embodiment, the clutch output terminal voltage and the current feedback signal are fed back to the clutch current calculation means by the clutch output circuit operation means, an exact clutch voltage is obtained from the clutch output terminal voltages by the clutch current calculation means while voltage drops in the electromagnetic clutch feeding mechanisms and wiring are taken in, the clutch actual current is obtained from this exact current feedback signal and the clutch resistance is obtained from this clutch actual current and the clutch voltage to calculate an actual temperature of the clutch, it is possible to prevent an erroneous detection of clutch temperature, resulting in that an accuracy of clutch temperature detection is improved and a clutch control protection system can be established without d' trading the safety for vehicle use and the commercial product quality.

Figure 3:
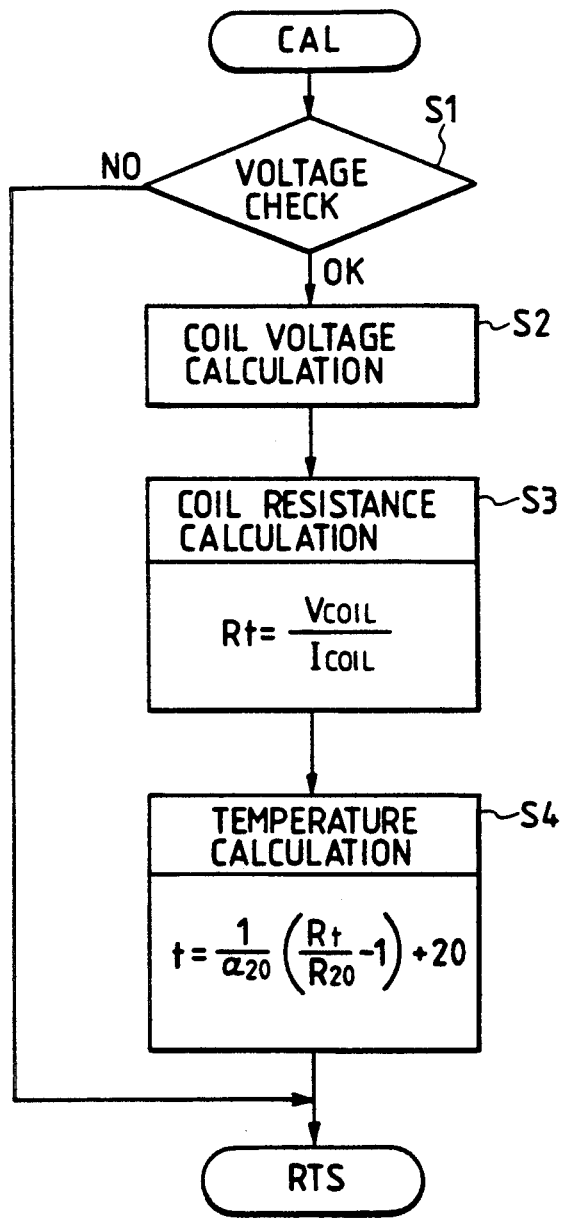
FIG. 3 is a flowchart showing an operation of another embodiment of the present invention.

Another embodiment of a temperature detection device of vehicle electromagnetic clutch according to the present invention will be described with reference to FIGS. 1 and 3.

A temperature calculation processing in the clutch current operation means 2 will be described with reference to a flowchart shown in FIG. 3. In the step S1 in FIG. 3, the source voltage vdc of the vehicle mounted battery 3 supplied to the clutch output circuit operation means 5 is digitized by the A/D converter 52 and supplied to the clutch current operation means 2.

In the clutch current operation means 2, it is determined whether or not the source voltage vdc is lower than the predetermined value and, when it is not below the predetermined value, the process proceed to the step S2.

In this step S2, the clutch output voltages va, vb supplied to the clutch output circuit operation detection means 5 are smoothened by the filter 51 and digitized by the A/D converter 52. A clutch voltage Vcoil is calculated from the A/D converted clutch output voltages va, vb by taking voltage drops of the feeding mechanisms 42a, 42b of the electromagnetic clutch 4 and associated wirings into consideration.

Then, in the step S3, a clutch resistance Rt is obtained from the clutch current instruction value Icoil of the clutch current instruction signal SI according to the following equation:ps $$Rt = Vcoil/Icoil \qquad (2)$$

Then, in the step S4, an actual temperature t of the clutch can be obtained from the above clutch resistance Rt.

Further, in the step S1, when the source voltage vdc is not more than the predetermined value, the processings in the steps S2–S4 are skipped and the clutch temperature detection is not performed.

In other words, when a predetermined amount of current can not be retained, the source voltage check is not performed and the clutch temperature detection is stopped.

Since, according to this embodiment, the clutch output terminal and source voltage are fed back to the clutch current calculation means by the clutch output circuit operation means, an exact clutch voltage is obtained from the clutch output terminal voltages by the clutch current calculation means while voltage drops in the electromagnetic clutch feeding mechanisms and wiring are taken in, the clutch current is obtained from this and the clutch current instruction value, the clutch resistance is obtained from this clutch current and the clutch voltage to calculate an actual temperature of clutch and since, further, when the source voltage is dropped below a predetermined value which can not retain a guaranteed value of source voltage at maximum clutch current, the clutch temperature detection is stopped, it is possible to prevent an erroneous detection of clutch temperature, resulting in that an accuracy of clutch temperature detection is improved and a clutch control protection system can be established without degrading the safety for vehicle use and the commercial product quality.

What is claimed is:

1. A temperature detection device for an electromagnetic clutch of a vehicle comprising:

clutch output circuit operation detection means for detecting a current feedback signal corresponding to an electromagnetic clutch output terminal voltage and a clutch current of said electromagnetic clutch, clutch current calculation means, responsive to running control information and engine control information, for providing a clutch current instruction signal and a clutch open signal, said clutch current calculating means comprising means, responsive to the clutch output terminal voltage fed back from said clutch output circuit operation detection means, for calculating a clutch voltage from a voltage drop in a wiring and a feeding mechanism of said electromagnetic clutch, and said clutch current calculating means further comprising means, responsive to said clutch voltage and clutch current corresponding to said current feedback signal, for calculating a clutch resistance to thereby calculate a clutch temperature and said clutch current instruction signal, and clutch current control means, responsive to a deviation between the clutch current instruction signal and the current feedback signal, and said clutch open signal, for controlling the clutch current.

2. A temperature detection device for an electromagnetic clutch of a vehicle comprising:

clutch output circuit operation detection means for detecting an output terminal voltage of said electromagnetic clutch and a source voltage, clutch current calculation means, responsive to running control information and engine control information, for providing a clutch current instruction signal and a clutch open signal, said clutch current calculation means comprising means, responsive to the electromagnetic clutch output terminal voltage and the source voltage fed back from said clutch output circuit operation detection means, for calculating a clutch voltage from voltage drops in a wiring and a feeding mechanism of said electromagnetic clutch, and said clutch current calculation means further comprising means, responsive to said clutch voltage and a clutch current instruction value corresponding to the clutch current instruction signal, for calculating a clutch resistance to thereby calculate a clutch temperature, and clutch current control means, responsive to a deviation between the clutch current instruction signal and current feedback signal corresponding to the clutch current, and to the open signal, for controlling the clutch current of said electromagnetic clutch.

* * * * *